UNITED STATES PATENT OFFICE.

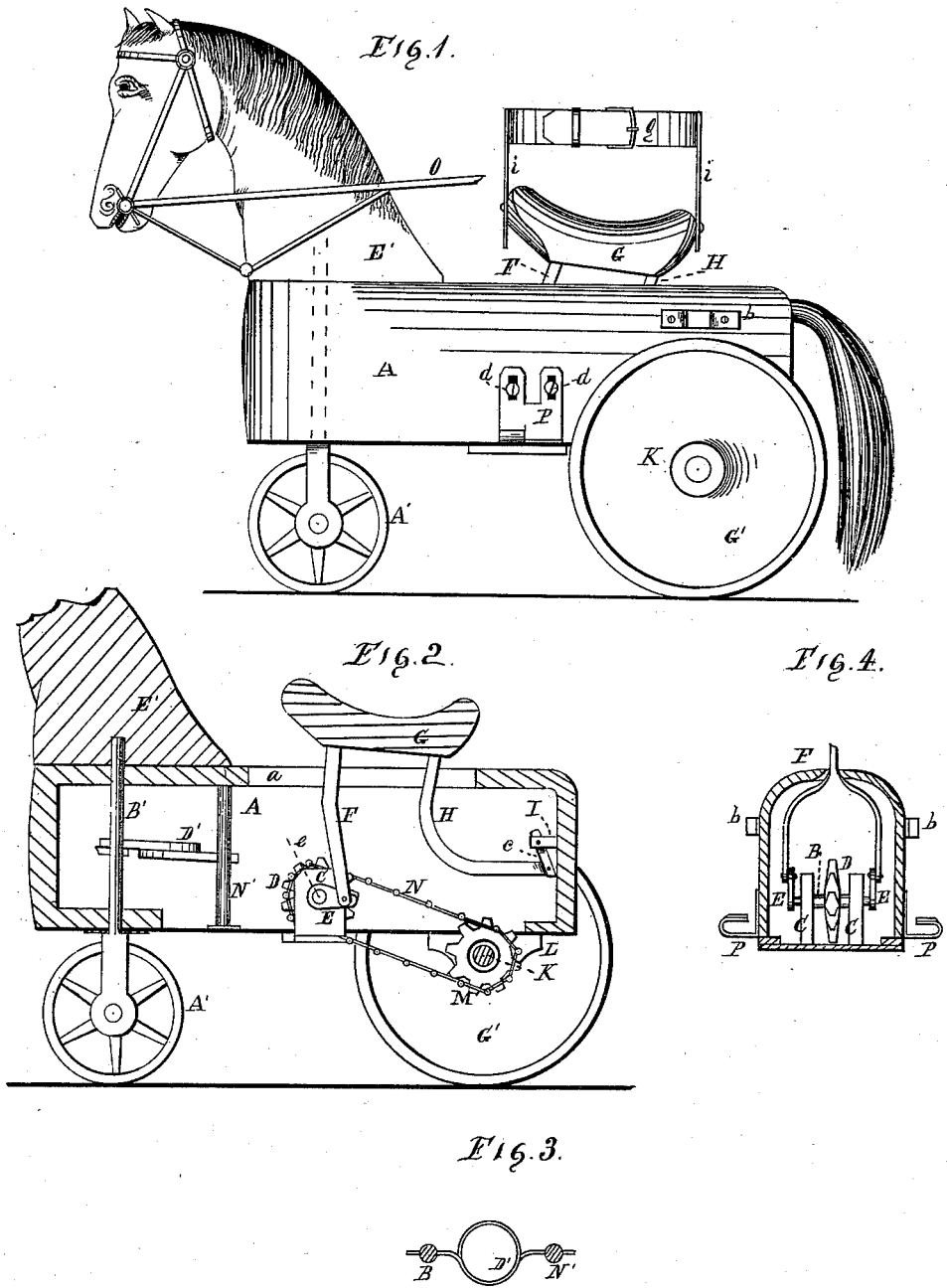

CARL BRASCH, OF CLEVELAND, OHIO.

IMPROVEMENT IN HOBBY-HORSES.

Specification forming part of Letters Patent No. 222,861, dated December 23, 1879; application filed October 22, 1879.

*To all whom it may concern:*

Be it known that I, CARL BRASCH, of Cleveland, in the county of Cuyahoga and State of Ohio, have invented a certain new and Improved Hobby-Horse; and I do hereby declare that the following is a full, clear, and complete description thereof.

This invention relates to a hobby-horse for the amusement and exercise of children. Said horse is propelled by the weight of the rider and the force of the body in rising as he rides upon the saddle, the saddle being attached by a bifurcated pitman to certain cranks secured, respectively, to the ends of a shaft carrying a sprocket-wheel, from which proceeds an endless chain to a corresponding sprocket-wheel on the shaft of the driving-wheels, which are driven thereby. The front part of the hobby-horse is supported on a caster guide-wheel. The stem of said wheel passes up through the shoulders of the horse into the lower part of its neck, and is therein firmly secured. The neck, not being fixed to the body of the horse, is adjustable, and can be turned around from one side to the other on being pulled by the reins, thereby turning the caster-wheel for guiding the apparatus.

A further and fuller description of the hobby-horse will be found in the following specification, reference being had to the accompanying drawings, making a part of the same, wherein—

Figure 1 is an external side view of the hobby-horse. Fig. 2 is a vertical longitudinal section. Fig. 3 is a detail view. Fig. 4 is a transverse section.

Like letters of reference refer to like parts in the several views.

As shown in the drawings, A represents the body of the horse, in which is journaled a shaft, B, in the standards C. On said shaft, between the standards, is a sprocket-wheel, D, and on the ends thereof are secured, respectively, the cranks E. To said cranks are attached the arms of the bifurcated pitman F, substantially as shown in Fig. 4. The upper end of the pitman passes through a slot, *a*, in the back of the horse, and is secured to the front end of the saddle or seat G. The rear end of the saddle is supported on an arm, H, the lower end of which is pivoted to a swing-bar, *c*, depending from a bracket, I, in which the said bar is pivoted.

G' are the driving-wheels, fixed on the ends of the shaft or axle K, Fig. 2. Said shaft has its bearings in boxes L, secured to the under side of the horse. On the shaft or axle K is a sprocket-wheel, M, Fig. 2, corresponding to the sprocket-wheel D, above alluded to. N is an endless chain passing around the two sprocket-wheels, substantially as shown in said Fig. 2.

The shoulders of the horse are supported on a caster guide-wheel, A'. The spindle or stem B' thereof passes up through the chest of the horse into its neck E', and is therein firmly made fast by any suitable means, while it is free to turn in the chest, as the neck is not rigidly secured to the body, but is adjustable; hence on turning the neck the caster-wheel will turn, as the neck is turned by the rider for guiding the horse, which is easily done by pulling on the reins O.

The caster-wheel is kept in the position shown in the drawings, so that the horse will go directly forward, by a hoop or coiled spring, D', Fig. 2, a detached view of which is shown in Fig. 3. One end of said spring is fastened in the stem of the caster-wheel, whereas the opposite end is fastened to a standard, N', keeping the spring in a horizontal position.

It will be obvious that on turning the caster for guiding the horse in either direction, which may be done by pulling upon the reins, the caster will again assume a forward position by virtue of the coiled character of the spring, the normal position of which, as shown in the drawings, will carry the horse directly forward; however, it may be turned around in either direction by a pull upon either of the reins, according to the way the horse is required to go.

The practical manner of driving the hobby-horse will be readily understood. The child takes his place astride the seat or saddle, placing his feet in the rests or stirrups P, which may be adjusted as to height by the set-screws *d*. The band Q is secured about his waist, against which to support the back and brace himself while operating the cranks for driving the horse, the reins being held in the hands in the ordinary way.

When the cranks are in the position shown in Fig. 4, and as indicated by the dotted line e in Fig. 2, being a little past the center, the weight of the rider on the saddle will carry the cranks down and propel the horse forward. At the moment the cranks are down, or nearly so, the rider rises from the seat and supports himself upon the stirrups. The act of raising the body lifts up the saddle by means of the belt i around the body, which is attached to the saddle by the straps j, which aids the mechanism in giving momentum to the horse, which will carry the cranks around to the line e, at which time the rider again takes his saddle, and by his weight the cranks are again carried around, and the horse driven forward by the connection of the sprocket-wheel D to the wheel M.

The belt, as it is attached to the saddle by the straps i and buckled around the body of the rider, will, as the rider rises upward on working the crank, draw upon the saddle, and thereby assist, in connection with the momentum the horse has acquired, to carry the cranks around to the line e, propelling forward the horse. This alternating rising up and sitting down of the rider is similar to that on riding a living horse.

The motion of the cranks is caused by the upward-and-downward movement of the saddle, which at the same time is carried backward and forward, making the exertion of the rider easy and agreeable for driving the horse, which, as above said, is guided by the reins, pulling on one or the other, as the case may be.

A canopy can be raised over the rider by inserting standards in the sockets b and spreading thereon the awning to protect the rider from sunshine or rain.

What I claim as my invention, and desire to secure by Letters Patent, is—

In hobby-horses or velocipede-horses, the combination of the caster-wheel attached to the head of the horse and actuated thereby, spring D', shaft B, carrying a sprocket-wheel and cranks, bifurcated pitman, saddle and stirrups P, arm H and swing-bar, axle K and driving-wheels, sprocket-wheels M, endless chain, and body of the horse, substantially as described, and for the purpose set forth.

CARL BRASCH.

Witnesses:
F. J. MOLEY,
SAM BLOOD.